(12) United States Patent
Ihre et al.

(10) Patent No.: US 7,060,187 B2
(45) Date of Patent: *Jun. 13, 2006

(54) POST-MODIFICATION OF A POROUS SUPPORT

(75) Inventors: Henrik Ihre, Uppsala (SE); Anders Larsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 165 days.

This patent is subject to a terminal disclaimer.

(21) Appl. No.: 10/496,763

(22) PCT Filed: Nov. 25, 2002

(86) PCT No.: PCT/SE02/02159

§ 371 (c)(1),
(2), (4) Date: May 25, 2004

(87) PCT Pub. No.: WO03/046063

PCT Pub. Date: Jun. 5, 2003

(65) Prior Publication Data

US 2005/0065282 A1    Mar. 24, 2005

(30) Foreign Application Priority Data

Nov. 26, 2001 (SE) .................................. 0103968

(51) Int. Cl.
*B01D 15/08*    (2006.01)

(52) U.S. Cl. ............... 210/656; 210/635; 210/198.2; 210/502.1; 502/402; 502/439; 525/243; 525/302; 525/305

(58) Field of Classification Search ............... 210/635, 210/656, 659, 198.2, 502.1; 502/402, 439; 536/123.1, 126; 525/243, 302, 305

See application file for complete search history.

(56) References Cited

U.S. PATENT DOCUMENTS

| 4,540,742 A | * | 9/1985 | Okamoto .................. 525/61 |
| 5,453,186 A | * | 9/1995 | Muller et al. ............ 210/198.2 |
| 5,503,933 A | | 4/1996 | Afeyan et al. |
| 5,633,290 A | | 5/1997 | Frechet et al. |
| 5,865,994 A | | 2/1999 | Riviello et al. |
| 5,929,214 A | | 7/1999 | Peters et al. |
| 6,022,902 A | | 2/2000 | Koontz |

(Continued)

FOREIGN PATENT DOCUMENTS

WO          WO 95/13861       *    5/1995

OTHER PUBLICATIONS

Viklund, C., et al., "Preparation of Porous Poly(styrene-co-divinylbenzene) Monoliths with Controlled Pore Size Distributions Initiated by Stable Free Radicals and Their Pore Surface Functionalization by Grafting" Macromolecules, vol. 34, 2001, pp. 4361-4369.

*Primary Examiner*—Ernest G. Therkorn
(74) *Attorney, Agent, or Firm*—Yonggang Ji

(57) ABSTRACT

The present invention relates to a method for post-modification of a macroporous polymeric support comprising one or more unreacted double bonds, which method includes the steps of contacting the support with a liquid comprising a grafting compound; and initiating a free radical reaction in the mixture obtained, wherein the grafting compound is comprised of a double bond as a reactive group coupled to a linear or cyclic chain of carbon. The grafting compound can be illustrated with vinyl ethers and/or styrene and styrene derivatives.

12 Claims, 4 Drawing Sheets

U.S. PATENT DOCUMENTS 6,153,707 A    11/2000  Davankov et al.
6,803,171 B1*  10/2004  Gronbeck et al. ....... 430/270.1

2005/0065282 A1*  3/2005  Ihre et al. .................. 525/54.1

* cited by examiner ately, the polymers are bonded to the support via radicals generated at the α-C atoms of the hydroxyl groups, and this kind of grafting therefore represent the principle "grafting from", see e.g. P F Rempp, P J Lutz: Comprehensive Polymer Science vol. 6, pp 403–421, Eds. G Allen et al, Oxford 1989. This technique is based on the initiation of polymerisation by a limited number of radicals on the support surfaces and is accordingly sensitive to termination by e g oxygen. The preferred monomers are monomers with a high rate of propagation, which typically means acrylamide, acrylate or methacrylate monomers. The polymers of these monomers are generally sensitive to hydrolysis, particularly under alkaline conditions. In practice, this means that the EP 0 337 144 grafted products are susceptible to hydrolysis, a feature that can be a disadvantage for certain applications.

POST-MODIFICATION OF A POROUS SUPPORT

This application is a filing under 35 U.S.C. §371 and claims priority to international patent application number PCT/SE02/02159 filed Nov. 25, 2002, published on Jun. 5, 2003 as WO 03/046063 and also claims priority to Swedish patent application number 0103968-4 filed Nov. 26, 2001; the disclosures of which are incorporated herein by reference in their entireties.

TECHNICAL FIELD

The present invention relates to the field of macroporous polymeric supports, especially for use in chromatography. More specifically, the invention relates to a novel method of post-modification of such a support, resulting in a support with much improved properties when used in separation applications, such as chromatography.

BACKGROUND

It is known from EP 0 337 144 (Merck Patent Gesellschaft mit beschränkter Haftung) to graft chromatographic supports in order to develop separation materials, which are universally employable in chromatography. The grafting is effected in the course of customary redox polymerisation. Cerium(IV) ions are employed as polymerisation catalyst in order to form radical sites on the pore surfaces of support particles. Thus, one object of EP 0 337 144 is to improve the dissolving ability as compared to the known materials, which is provided by use of hydrophilic separation based on supports containing hydroxyl groups, the supports of which are coated with covalently bonded polymers. More specifi- U.S. Pat. No. 5,929,214 (Peters et al) discloses porous synthetic polymer monoliths wherein the pores contain grafted temperature-responsive polymers and copolymers. These monoliths are especially suitable for use as thermal gates or thermal valves. The pores in such monoliths are greater than about 600 nm in diameter, and therefore the polymers need to be of a sufficient size to occlude such macropores. Suitable monomers to form the thermally responsive polymers grafted onto the support of the pores are known and include acrylamides and methacrylamides substituted on the nitrogen atom with slightly hydrophobic groups, vinylcaprolactam, methyl vinyl ether, 3-hydroxypropylacrylate, vinyl acetate, 2-($C_2$-$C_6$)-alkyl-1-vinyloxazolines, ethylene oxide, propylene oxide, as well as copolymers thereof with copolymerisable comonomers which do not preclude thermal responsiveness of the resulting polymer. Suitable comonomers, e.g. methylenebisacrylamide with N-alkylacrylamide, may be used to provide cross-linking and controllable swelling or other desirable properties. The polymers produced according to U.S. Pat. No. 5,929,214 undergo a rapid and reversible phase transition from a first structure, below their lower critical solution temperature (LCST), to a second structure, above their LCST, and are therefore referred to as "thermo-shrinking" polymers.

Dhal et al (Dhal, Pradeep K; Vidyasankar, S.; Arnold, Frances H. Division of Chemistry and Chemical Engineering, California Institute of Technology, Pasadena, Calif., USA. Chem. Mater. (1995), 7(1), 154–62) have disclosed surface grafting of functional polymers to macroporous poly(trimethylolpropane trimethacrylate). The type of functional monomer is selected in order to retain the physical properties of the original matrix.

Furthermore, it is known from U.S. Pat. No. 5,503,933 to form a hydrophilic-coated support, which comprises a hydrophobic domain including an unsaturated group and a hydrophilic domain. Hydrophilic coatings can e.g. be covalently attached to hydrophobic polymers, such as divinylbenzene cross-linked polystyrene. The purpose of the coatings described is to mask the hydrophobic supports and to provide a polymer, which is chemically stable at high and low extremes in pH.

It is also known that micropores present in porous chromatographic particles are undesired, since they can cause steric hindrance effects. Such steric effects will result in a slower diffusion, in turn giving rise to a poor resolution. The problems of micropores in chromatographic resins have been discussed, see e.g. F Nevejans, M Verzele: J Chrom 406, 325–342 (1987), wherein negative effects of micropores in reverse phase chromatography (RPC) are described. One way to eliminate micropores has been treatment with epoxy resins in order to occlude said pores. This is however a complicated process, and there is a need within this field of simplified methods to eliminate micropores in mesoporous and macroporous chromatographic resins.

Finally, U.S. Pat. No. 5,865,994 (Dionex Corporation) discloses a bifunctional cation-exchange composition comprised of crown ether functional groups, which allow formation of a complex with a cation, and non-crown ether cation-exchange functional groups, which are capable of charge-interaction with cations. Preferred non-crown ether functional groups are sulphonate, carboxylate and phosphonate groups. In U.S. Pat. No. 5,865,994, a comparative example of a standard cation-exchange resin is provided, wherein carboxylate-functional groups and a linker are grafted onto a macroporous polymeric resin. More specifically, the carboxylate groups are provided by maleic anhydride, while the linker is ethyl vinyl ether. In this context, it is well known that vinyl ethers in general are very difficult to polymerise as the sole monomer. See e.g. "Principles of Polymerization", Third Edition, page 200, Author: George Odian, and publisher: John Wiley & Sons, Inc., wherein in Table 3-1, the family of vinyl ethers are rated as a – (minus) for radical polymerisation. However, in the comparative example discussed above and presented in U.S. Pat. No. 5,865,994, polymerisation is possible since the maleic acid anhydride acts as an electron acceptor while the ethyl vinyl ether acts as the electron donor.

SUMMARY OF THE INVENTION

One object of the invention is to provide a process of post-modification of a polymeric macroporous support, which is simplified in terms of time requirement and complexity as compared to the previously used methods. This is achieved by grafting relatively short polymer chains via unreacted double bonds present on the support, as described in claim 1 and the dependent claims.

Another object of the present invention is to provide a process for post-modification of a polymeric macroporous support, the robustness of which is improved as compared to prior art methods.

A further object of the invention is to provide a polymeric macroporous support useful as a chromatographic matrix, wherein steric hindrance effects are reduced. This is achieved by a post-modification of a polymeric macroporous support as above, wherein the grafting compound used provides chains of a suitable length to essentially block micropores, while leaving the larger pores open for diffusive transport.

Yet another object of the present invention is to provide a polymeric macroporous support useful as a chromatographic matrix, which exhibits an improved resolution as compared to prior art supports. Such a support is provided by use of the post-modification described above, which method can improve both the column efficiency and the selectivity.

Another object of the present invention is to provide a method of post-modification of a macroporous polymeric support, which method allows an enhanced flexibility as regards the degree of hydrophobicity and hydrophilicity obtained in said support. For example, by using a hydrophilic monomer as the grafting compound, such as a hydrophilic vinyl ether, the support is rendered hydrophilic. Such a hydrophilic support can in turn be used in the manufacture of an ion exchanger, affinity chromatography resin etc, which will be essentially free from undesired, non-specific hydrophobic interactions. Alternatively if e.g. a hydrophobic vinyl ether, or a styrene or styrene derivative, is used as grafting compound, a support which is essentially hydrophobic in nature will be obtained. Thus, by suitably selecting the grafting compound used in the novel method of post-modification, the degree of hydrophobicity of the so modified support is easily controlled.

Thus, a further object of the present invention is to provide a macroporous polymeric support for use in chromatography with improved efficiency and selectivity when used in reverse phase chromatography (RPC). This is achieved by a post-modification of a conventional chromatographic support in accordance with claim 1, wherein the grafting compound is styrene, a derivative thereof or vinyl ether. Such grafted supports will advantageously be used in RPC, since they provide an improved resolution Yet another object of the invention is to provide a macroporous polymeric chromatographic support which is less susceptible to hydrolysis than the prior art silica matrices conventionally used in RPC, which are susceptible to degradation by alkaline conditions. Thus, the present invention provides a support, which for example is stable in conventional cleaning procedures using sodium hydroxide. This is achieved by the method of post-modification above.

DEFINITIONS

Figure 1:
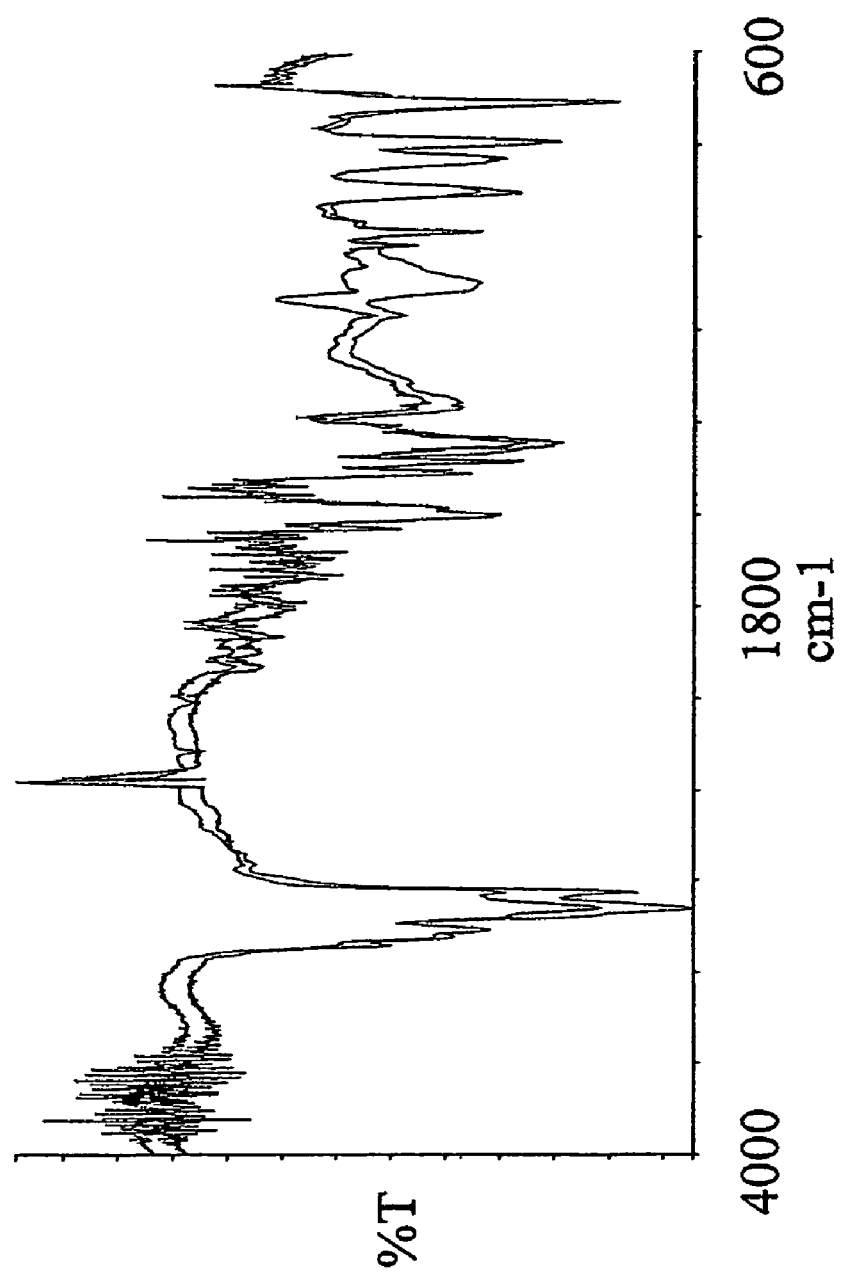
FIG. 1 is an IR spectrum showing a divinylbenzene (DVB) resin (SOURCE™, Amersham Biosciences AB, Sweden) with unreacted vinyl groups and the corresponding DVB resin after post-modification with octadecyl vinyl ether as described in Example 1.

In the present specification, terms that are not specifically explained are used in the conventional meaning that a person skilled in the art would understand from reading in the present context.

The term "macroporous" refers to material of a defined pore size: According to the IUPAC definition, micropores are of a diameter <2 nm, mesopores have a diameter within the interval of 2–50 nm and macropores are of a diameter >50 nm. Micropores can be present in an outer surface of a support, but also within mesopores or macropores as defined above. Thus, it is to be understood that a material is classified according to its largest pores. Consequently, the term "macroporous" as used herein refers to a material, which may well also contain mesopores and/or micropores.

The term "grafting" is used herein for a second polymerisation, wherein groups such as double bonds that have remained unreacted after a first polymerisation are now reacted. (For a review of different principles of grafting, see e.g. P F Rempp, P J Lutz: Comprehensive Polymer Science vol. 6, pp 403–421, Eds. G Allen et al, Oxford 1989.)

DETAILED DESCRIPTION OF THE PRESENT INVENTION

More specifically, the present invention relates to a method for post-modification of a macroporous polymeric support comprising one or more unreacted double bonds, which method includes the steps of
 (a) contacting the polymeric support with a liquid phase comprising one or more grafting compounds;
 (b) initiating a free radical reaction in the mixture obtained from step (a) between one or more double bonds on said polymeric support and one or more reactive groups on the grafting compound, and optionally
 (c) washing the polymeric support to remove any excess of grafting compound;
wherein the grafting compound(s) are comprised of a double bond as a reactive group coupled to a linear or cyclic chain of carbon, which optionally comprises one or more heteroatoms. The unreacted double bonds can remain from the manufacture of the support and/or have been introduced deliberately. The unreacted double bonds are also understood to be accessible for reaction, as described herein.

As mentioned above, the present method of post-modification is a flexible method including improved possibilities to introduce one or more functional groups for future use in ion exchange methods. The method of grafting according to the invention results in an advantageous polymerisation within macropores as well as on the outer surface of the support, and improved results in chromatography has been shown, presumably due to an improved mass transport.

An unexpected effect of the present post-modification is that it has been shown to eliminate or at least provide an essential reduction of the number of micropores present in a macroporous polymeric support. As discussed above, micropores may in some cases be undesired in chromatographic supports, and previous attempts to eliminate such micropores have been complicated and time-consuming procedures. Accordingly, the post-modification according to the present invention results in a grafted polymeric support, which exhibits a reduced number of steric interactions when used in chromatography. Thus, use of a post-modified support according to the present invention in separation e.g. by ion exchange or reverse phase chromatography can provide improved results such as a higher resolution, as compared to use of a conventional support.

The post-modification according to the present invention is a grafting of suitable compounds to unreacted double bonds, i.e. unsaturated groups, present on a polymeric support. Instead of using such double bonds, the above discussed EP 0 337 144 (Merck) suggests to graft via α-C atoms of hydroxyl groups present on said support. Accordingly, one difference between the present invention and EP 0 337 144 is that the post-modification provided by the present invention can, with an appropriate choice of starting materials, result in a support which is essentially stable to hydrolysis, while the supports grafted according to said EP 0 337 144 will prove to be more susceptible to hydrolysis, e.g. by alkali. Consequently, an advantage of the present invention as compared to the prior art is that a support post-modified according to the invention will be more tolerant to conventional cleaning procedures using alkali without any degradation of the RPC matrix taking place.

The problem solved by the above discussed U.S. Pat. No. 5,929,214 is to provide a monolith that can function as a thermal gate. This is achieved by a polymerisation sufficient to occlude macropores under specified conditions. To enable such occlusion, the polymerisation according to U.S. Pat. No. 5,929,214 will need to be performed to an extent that provides relatively long polymer chains. In fact, U.S. Pat. No. 5,929,214 even teaches to include a certain amount of cross-linking monomer in order to increase the molecular size to facilitate such occlusion of the pores. Radical polymerisation of vinyl ethers is not specifically suggested in U.S. Pat. No. 5,929,214, presumably because the required polymer chain length would not be possible to obtain that way. The polymers grafted according to U.S. Pat. No. 5,929,214 are in practice large enough to reduce or even stop both convective and diffusive flows, which obviously renders these materials unsuitable for use in chromatography. Contrary, the novel post-modification according to the present invention is provided by free radical polymerisation, and results in macroporous polymeric supports wherein macro pores are still available for subsequent chromatographic procedures.

Macroporous bead polymers of cross-linked polymers can for example be prepared by conventional suspension polymerisation (see e.g. J. R. Benson and D. J. Woo, J. Chromatographic Sci., 1984, 22, 386). First, a monomeric material, a cross-linker and a porogenic diluent are suspended as droplets in an oil-in-water emulsion with the aid of an emulsifier. With the addition of an initiator, polymerisation proceeds in the droplets to form gel beads containing the porogenic diluent solvent entrapped within the polymeric matrix. The entrapped porogen is removed by extraction with a second solvent such as ethanol, acetone, toluene, etc., leaving macropores free from solvent in the polymer matrix after evaporation of the second more volatile solvent. On the other hand, the cross-linked polymer phase forms micropores in the matrix. Desired functionality is provided on the surface of the polymers by dervatisation thereof.

Macroporous beads are also commercially available, e.g. from Dynal Particles A/S, Norway.

In one embodiment of the present method step (b) is performed by adding a free radical initiator in an amount sufficient to polymerise added grafting compound to the polymeric support. The free radical can be any suitable commercially available initiator, based e.g. on diacetyl peroxide, dibenzoyl peroxide, dilauroyl peroxide, t-butyl peroxypivalate, t-butyl peroctoate, t-amyl peroxypivalate, t-butyl peroxy-2-ethylhexanoate, di-(4-t-butylcyclohexyl) peroxydicarbonate, 2,2'-azobis(isobutyronitrile), 2,2'-azobis(2,4-dimethylvaleronitrile), or 1,1'-azo-bis (cyanocyclohexane), and mixtures thereof. Specific examples are the products V65 (=2,2'-azo-bis(2,4-dimethylvaleronitrile, Wako Pure Chemical Industries) or AIBN (=2,2'-azobis(isobutyronitrile), also from Wako Pure Chemical Industries). The choice of the free radical initiator is easily made by the skilled in this field considering the grafting compound used, which will be discussed in more detail below. The amount thereof is not critical and is easily selected by the skilled in this field, e.g. within the range of 1–10 mol % (per monomer). The basic consideration when deciding a suitable amount of free radical initiator would simply be that substantial excess thereof might have a negative impact on the polymerisation, while a too small amount may not be sufficient for the desired result.

The radical reaction between reactive groups on the grafting compound, the double bonds present on the support and the free radical initiator discussed above can be set off by any conventional method, such as heating, irradiation with UV light, addition of a chemical etc. Alternatively, the polymerisation can be initiated by gamma- or electron radiation, in which case no initiator needs to be present. If heating is used, a heat bath, an oven etc can be used. The exact temperature will depend e.g. on the nature of the grafting compound and the free radical initiator, but can for example be above about 50° C., such as about 70° C., and can continue during a suitable period of time, such as between 2–20 hours.

As mentioned above, one of the advantages of the present invention is the simplicity of the method. Thus, the polymerisation reaction described above is based on conventional chemistry, and the steps do not require any specific equipment etc and are easily adapted as suitable by the skilled in this field. Naturally, the same considerations can be applied here as for any conventional free radical polymerisation process, where the advantages e.g. of working without contact with oxygen etc can be utilised. However, such details are well known to the skilled in this field, and do not change the concept of the invention as defined by the claims.

A further advantage of the present invention is that it provides a pure form of copolymerisation. Accordingly, as compared to e.g. U.S. Pat. No. 5,968,363, wherein bifunctional polymers are produced using more than one type of monomer, the present post-modification will result in a more even distribution of polymer chain lengths, which is a probable reason for the above described occlusion of micropores while macropores are still available for subsequent use in chromatography. In radical polymerisation, vinyl ethers homopolymerise sluggishly, giving short chains. When copolymerised with strongly electron attracting monomers like maleic anhydride, they will however form much longer chains with an alternating copolymer chain structure. These longer chains may easily occlude also macropores in a non-desirable fashion. Also the presence of carboxylic anhydride groups in the chains is non-desirable in RPC, HIC and anion exchange applications since they easily hydrolyse to form carboxylic acid groups.

In most cases, the post-modification according to the invention also includes a step for washing the grafted gel polymeric support as described in step (c). Such as washing can for example be performed using water, methanol ethanol acetone, or any other suitable buffer or solution, depending on the grafting compound and the polymeric support used. Such a removal of excess monomer, oligomers and polymers not covalently coupled to the gel is a conventional measure in this field and the skilled person can easily decide on the conditions thereof.

In order to decide the degree to which there still remain double bonds on the polymeric support after the post-modification according to the invention, the most convenient way is simply to use a gravimetric method. Put differently, the support is weighed before and after post-modification, and the weight increase will represent the grafted compound. More specifically, the amount of grafted polymer will be inversely proportional to the number of remaining double bonds. Alternatively, the result can be evaluated using IR, as conventionally used in this field. Thus, the skilled person can easily perform a control experiment in order to decide the quantitative or qualitative results of a post-modification according to the invention.

The macroporous polymeric support is advantageously a chromatographic support, such as the support of a matrix in particle (bead) or in continuous (monolith) form, prepared from a hydrophobic base matrix, such as polydivinylbenzene and polystyrene, optionally as copolymers with each other, etc. The matrix is built up of a polymeric network exposing hydrophobic groups on the support that is to contact a liquid sample which is to be subject to separation, i.e. both on outer surfaces and on pore surfaces. In an advantageous embodiment, the present support is in the form of one or more particles.

Thus, in one embodiment, said macroporous polymeric support is a chromatographic support prepared from methacrylates and/or styrene derivatives as monomers.

In a specific embodiment of the present method, the macroporous polymeric support comprises divinylbenzene (DVB), and can e.g. be any commercially available macroporous bead, prepared e.g. by suspension polymerisation or activated swelling methods.

Thus, in one embodiment, the macroporous polymeric support to be post-modified can be present on beads such as SOURCE™ (Amersham Biosciences AB), Dynospheres® etc. Materials that are especially advantageously used according to the invention are those wherein the support density of unsaturated groups is relatively high, since such materials will provide a large number of sites available for derivatisation usefull in subsequent chromatographic applications.

In an advantageous embodiment, the grafting compound comprises a group which is a readily derivatised functionality, such as a hydroxyl group. The hydroxyl may be derivatised e.g. with glycidol. Plural molecules of glycidol may be polymerically attached to the hydroxyl by addition of boron trifluoride etherate to produce a covalent coating comprising polymer chains including plural hydroxyls. Alternatively, hydroxyls may be oxidised to produce plural carboxylic acid groups. In another embodiment, the hydroxyl may be reacted with a compound such as an epihalohydrin, such as epibromohydrin, to produce a terminal halide on the covalent coating, which may be reacted with an amine to produce a quaternary amine.

Normally, the grafting compound refers to a monomeric compound, and hence the monomers will be discussed below. During the grafting reaction, added monomer will react directly with the unreacted double bond present on the support. However, it is probable that at the same time some monomers first react with each other to form shorter polymer chains, which in turn are grafted to the support via said unreacted double bonds.

One aspect of the present method is a method of post-modification of a macroporous polymeric support, wherein the grafting compound(s) are described by the general formula (I):

wherein
R=a $C_0$ to $C_{30}$ alkyl chain, optionally substituted with one or more hydroxyl, amine, carbonyl, ether, oxygen or any other suitable group that has no or a minimal negative impact on the properties of the final support;
R'=H or $CH_3$;
R"=a $C_0$ to $C_{30}$ aliphatic or aromatic group; or oxygen; and
X=$O_n$, wherein n is an integer of 0–1, with the proviso that if R" is an oxygen or an aromatic group, then n is 0, and if R" is an alkyl chain, then n is 1.

In one embodiment, R is a $C_1$ to $C_{30}$ alkyl chain and R" is a $C_0$ to $C_{30}$ aliphatic group or an oxygen.

Thus, it has been found that the grafting compound advantageously comprises one double bond and one ether functionality, optionally separated from each other by one or more carbon atoms. Preferably, the grafting compound is a vinyl ether wherein the carbon chain is comprised of at least 2 carbons, i.e. ethyl vinyl ether.

More specifically, in one embodiment, the grafting compound is described by formula (I), wherein R is a $C_1$–$C_{10}$ alkyl chain chain, R' is H, R" is O and n is the integer 0. In another specific embodiment, R is a $C_{17}$ alkyl chain, while R' is H, R" is O and n is the integer 0. Thus, in this embodiment, the grafting compound is a vinyl ether. There are about 150 different vinyl ethers commercially available at present. In a specific embodiment, the grafting compound is either a homopolymer of one kind of vinyl ether or a mixture of two or more different vinyl ethers. As mentioned in the section. Vinyl ethers are known to polymerise readily under cationic conditions, but the present invention discloses for the first time a free radical polymerisation thereof which is satisfactory for the purpose of grafting a polymeric support. In general, vinyl ethers in liquid form having a boiling point above about 100° C. are preferred, since they are conveniently handled. Thus, any vinyl ether, such as a ethyl vinyl ether, n-butyl vinyl ether, iso-butyl vinyl ether, tert-butyl vinyl ether, cyclohexyl vinyl ether, octadecyl vinyl ether, hydroxybutyl vinyl ether, ethylene glycol mono vinyl ether, cyclohexanedimethanol monovinyl ether etc, is conveniently used. The technical effect observed especially when vinyl ethers are used as grafting compounds is that they appear to provide a polymerisation which is sufficiently efficient to provide a large number of sites available for subsequent derivatisation in macropores and on bead supports, while at the same time the polymerisation obtained is not efficient enough to occlude the macropores. This result was unexpected, and contributes to the advantages obtained by the present invention.

In one embodiment of the present method, the grafting compound comprises at least one functional group in addition to the reactive double bond, which functional group is available as a ligand on the surface of the so modified support Accordingly, bi or multifunctional polymeric supports can be prepared by the present method.

In another aspect of the present method of post-modification of a macroporous polymeric support, the grafting compound is described by the general formula

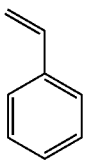
(II)

wherein the ring can carry any suitable substituent that has no or a minimal negative impact on the desired properties of the final product. Accordingly, this embodiment also encompasses derivatives of formula (II), i.e. styrene derivatives. Suitable styrene derivatives are easily selected by the skilled person in this field, optionally after routine testing thereof.

In an advantageous embodiment, the present method is suitable for preparation of a reverse phase chromatography (RPC) resin.

In a specific embodiment, the present method includes a further step
(d) using the post-modified chromatographic support so prepared in chromatography, preferably in reverse phase chromatography (RPC).

RPC is a method, which is often used for separation and purification of e.g. peptides and smaller proteins. The present inventors have surprisingly found that a polymeric support post-modified by the method according to the invention if used in RPC can provide much improved results as regards effectivity and selectivity. In some cases, such as with insulin; conventional RPC using silica matrices have been found to give better results than divinyl-based matrices. However, use of silica in this context includes drawbacks due to its sensitivity to alkali. Silica-based materials are consequently unsuitable for use in methods wherein cleaning in place (CIP) is performed, since such cleaning normally uses sodium hydroxide. Accordingly, the lifetime of a silica-based matrix is too short to be economic. However, post-modification of a divinyl-based matrix have been shown by the present inventors to results in a material which gives better results as concerns e.g. resolution, as shown in the experimental part below. Accordingly, in an especially advantageous embodiment, the present method is used to purify insulin by RPC using a matrix, which has been post-modified as described above. Such a purification according to the invention can e.g. be the last step in a process where insulin has been produced recombinantly, and a coarse capture step has first been performed e.g. by ion exchange chromatography, which is followed by RPC as discussed above. Alternatively, the present support is used in a capture-step in the purification of insulin. Naturally, the present invention is also advantageous for other and similar proteins, e.g. for a last purification to a high degree of purity using RPC. Especially proteins which have a subsequent pharmaceutical use are especially advantageously purified this way, since it enables to reach as high levels of purity as required within that industry. Another advantageous example of where RPC using a post-modified macroporous polymeric support according to the invention can be utilised is for analytical purposes, i.e. on a smaller scale than the above discussed preparative chromatography.

The present invention also encompasses a polymeric support that has been post-modified by use of the above-described method. Such a support can e.g. be particles, a monolith or even a membrane and is useful in chromatographic or batch-wise separations. Thus, the invention also encompasses the use of a post-modified macroporous polymeric support as defined above in chromatography.

A last aspect of the invention is a chromatographic column comprising a post-modified macroporous polymeric support as defined above. Such a column may e.g. be a packed column, and may for example be a part of a kit for use in chromatography, such as RPC, or a large-scale column for purification on an industrial scale.

DETAILED DESCRIPTION OF THE DRAWINGS

FIG. 1 is an IR spectrum showing a divinylbenzene (DVB) resin (SOURCE™), Amersham Biosciences AB, Sweden) with unreacted vinyl groups and the corresponding DVB resin after post-modification with octadecyl vinyl ether as described in Example 1. As appears from the figure, nearly all of the remaining vinyl groups were consumed (985 cm$^{-1}$) and a significant amount of the octadecyl vinyl ether has been incorporated (1096$^{-1}$) into the resin.

Figure 2:
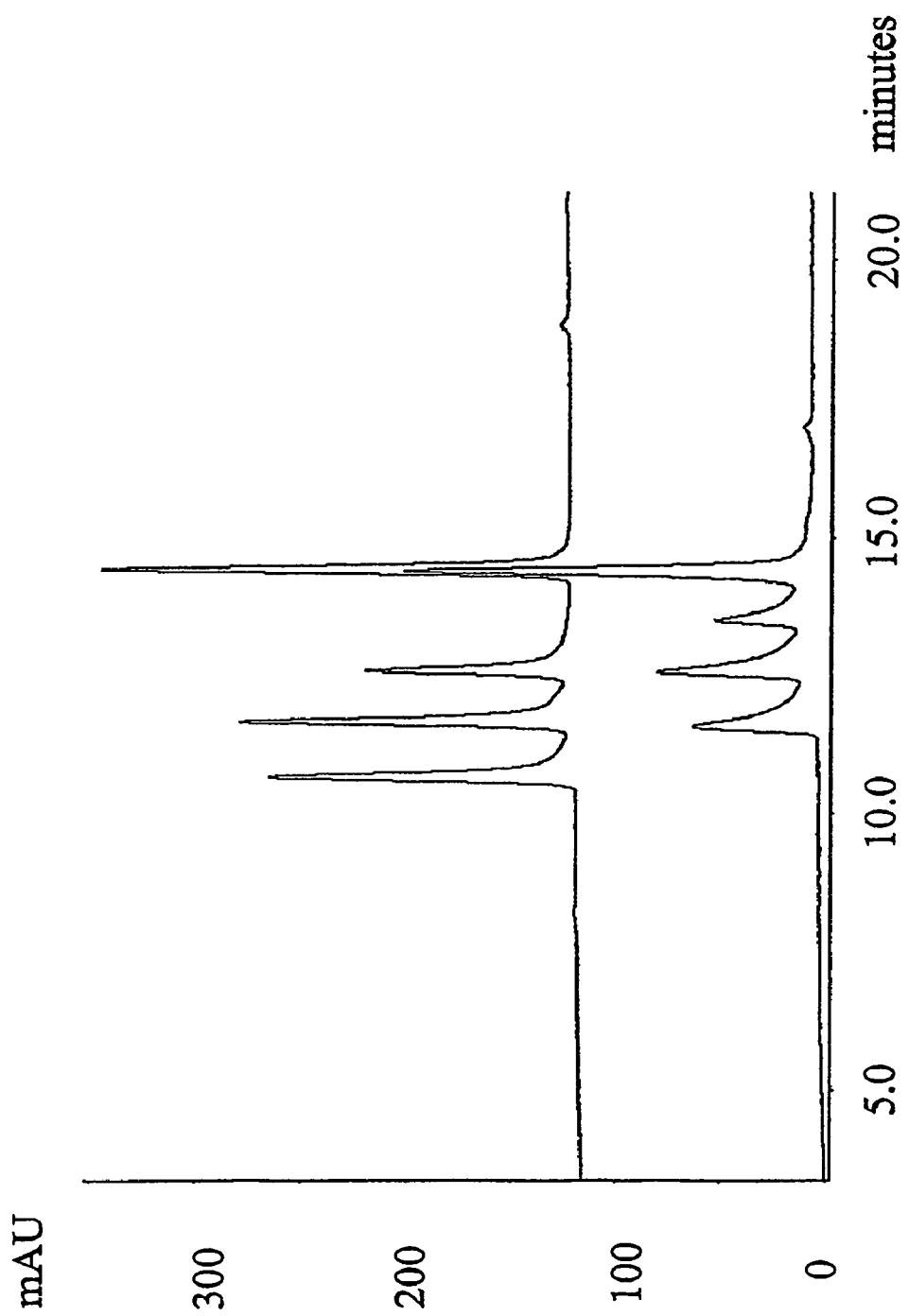
FIG. 2 shows the separation of four peptides by RPC using the immodified resin (bottom) and post-modified resin (top) described above.

FIG. 2 shows the separation of four peptides by RPC using the unmodified resin (bottom) and post-modified resin (top) described in Example 1.

Figure 3:
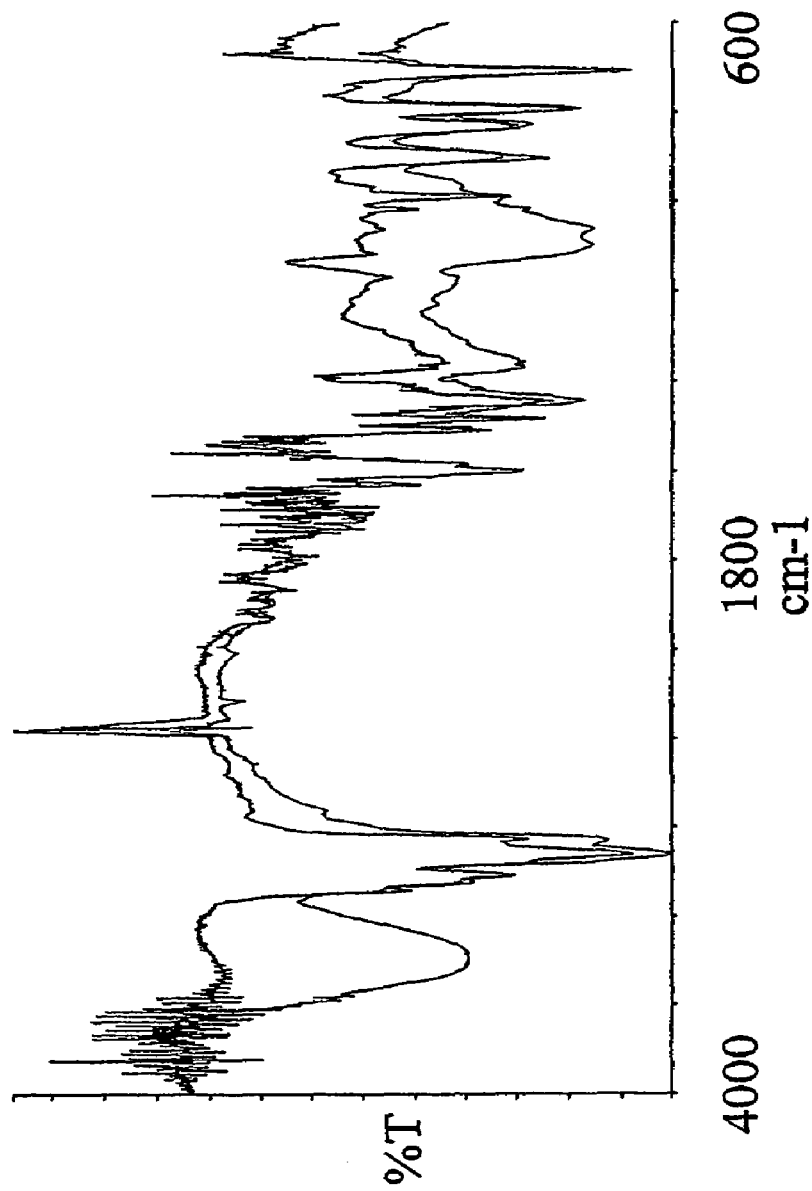
FIG. 3 is an IR spectrum showing a DVB resin (SOURCE™) with unreacted vinyl groups and the corresponding DVB resin after post-modification with hydroxybutyl vinyl ether as described in Example 2.

FIG. 3 is an IR spectrum showing a DVB resin (SOURCE™) with unreacted vinyl groups and the corresponding DVB resin after post-modification with hydroxybutyl vinyl ether as described in Example 2. As appears from the figure, nearly all of the remaining vinyl groups were consumed (985 cm$^{-1}$) and a significant amount of the hydroxybutyl vinyl ether has been incorporated (1096$^{-1}$ and 3400$^{-1}$) into the resin.

Figure 4:
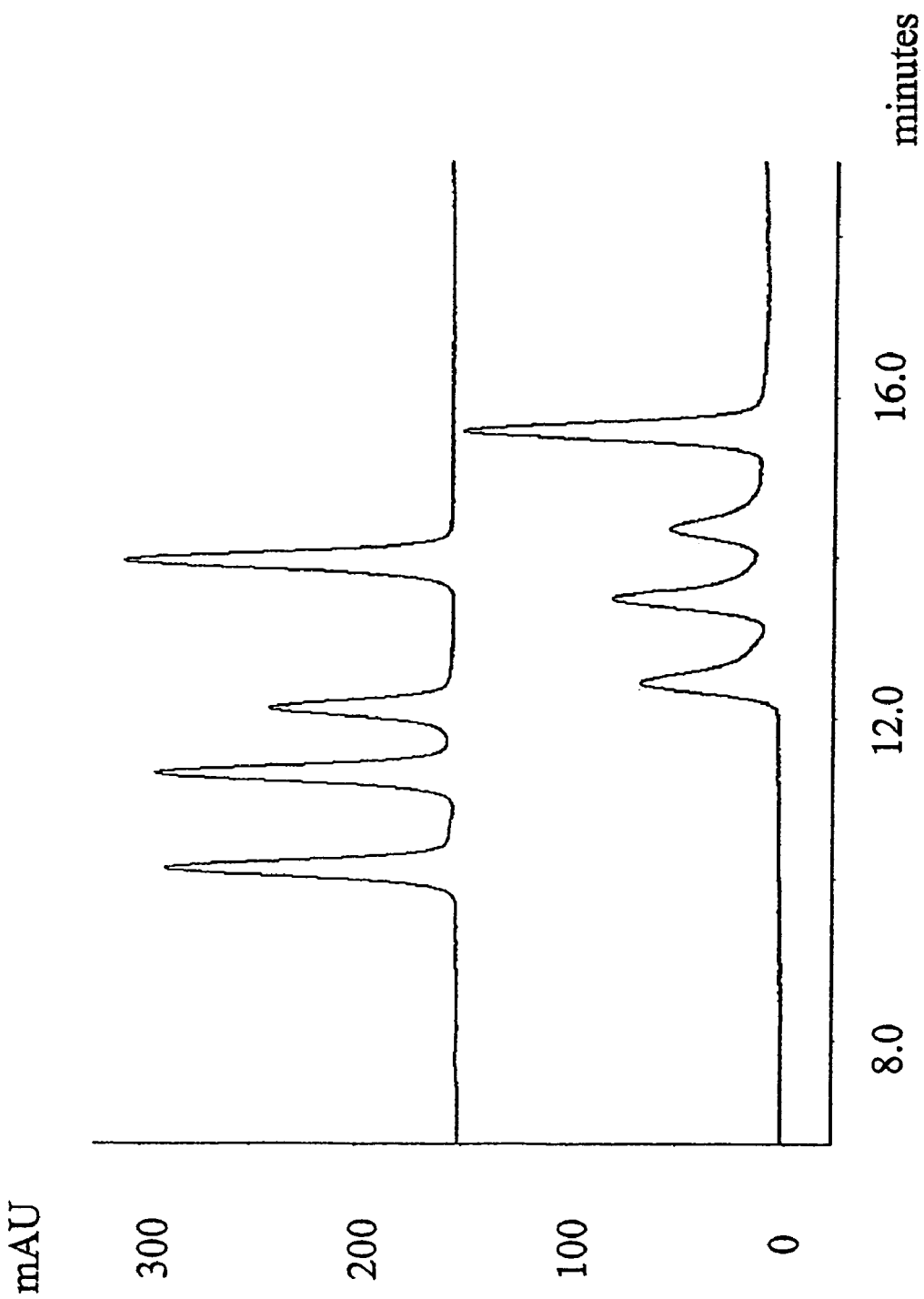
FIG. 4 is a chromatogram showing the separation of four peptides by RPC. DVB resin (SOURCE™) with unreacted vinyl groups (bottom) and the corresponding DVB resin after post-modification with styrene as described in Example 3.

FIG. 4 is a chromatogram showing the separation of four peptides by RPC. DVB resin (SOURCE™) with unreacted vinyl groups (bottom) and the corresponding DVB resin after post-modification with styrene as described in Example 3.

Experimental Par

The present examples are included herein for illustrative purposes only and should not be interpreted as limiting the invention as defined by the appended claims. All references included below and elsewhere in the present specification are hereby included by reference.

EXAMPLE 1

Support Post-modified by Octadecyl Vinyl Ether and Used in RPC 1.0 gr. 2,2'-azo-bis(2,4-dimethylvaleronitrile (V-65) was dissolved in 2.0 mL toluene and then added to 40.0 mL Octadecyl vinyl ether at 30° C. 4.oo gr. of a macroporous DVB resin with remaining vinyl groups accessible for radical polymerisation were soaked in the monomer/initiator solution. The reaction mixture was gently stirred with a mechanical stirrer at 70° C for 15 hours. After complete reaction excess monomer, oligomers and polymers not covalently coupled to the resin were removed by a washing procedure using hexane as solvent 4.75 gr. Octadecyl vinyl ether modified resin was obtained yielding an increase in mass of 19%. As shown in the IR spectra (FIG. 1) nearly all of the remaining vinyl groups were consumed (985 cm$^{-1}$) and a significant amount of the octadeceyl vinyl ether has been incorporated (1096 cm$^{-1}$) into the macroporous DVB resin. Furthermore, the positive effect of grafting octadecyl vinyl ether from a macroporous DVB resin is shown for the separation of four peptides by RPC (Ile$^7$-Angiotensin-III, Val$^4$-Angiotensin-III, Angiotensin-I, Angiotensin-III; see FIG. 2), prepared and run according to standard procedures well known to the skilled in this field.

EXAMPLE 2

Preparation of Ion Exchanger from a Support Post-modified by Hydroxbutyl Vinyl Ether 1.0 gr. 2,2'-azo-bis(2,4-dimethylvaleronitile (V-65) was dissolved in 40.0 mL Hydroxybutyl vinyl ether. 4.oo gr. of a macroporous DVB resin with remaining vinyl groups accessible for radical polymerisation were soaked in the monomer/initiator solution. The reaction mire was gently stirred with a mechanical stirrer at 70° C for 15 hours. After complete reaction excess monomer, oligomers and polymers not covalently coupled to the resin were removed by a washing procedure using methanol as solvent. 4.94 gr. Hydroxybutyl vinyl ether modified resin was obtained yielding an increase in mass of 24%. As shown in the IR spectra (FIG. 3) nearly all of the remaining vinyl groups were consumed (985 cm$^{-1}$) and a significant amount of the Hydroxybutyl vinyl ether has been incorporated (1096 and 3400 cm$^{-1}$) into the macroporous DVB resin. 10 mL 5 M NaOH was allowed to react with 2.0 gr. of the Hydroxybutyl vinyl ether grafted resin for 30 minutes. Excess base was removed by filtration until the "first crack" was observed in the filter cake. The resin was then added to 10 mL of an aqueous glycidyl tri-methyl ammonium chloride solution and allowed to react using a mechanical stirrer for 20 hours at room temperature. After complete reaction excess glycidyl tri-methyl ammonium chloride was removed by a washing step using water as solvent. Titration of the prepared anion-exchange resin showed a capacity of 54 µmol Cl$^-$/mL.

EXAMPLE 3

Support Post-modified with Styrene for Use in RPC 1.0 gr. 2,2'-azo-bis(2,4-dimethylvaleronitrile (V-65) was dissolved in a solution of 24.0 mL Styrene and 16 mL Toluene. 4.oo gr. of a macroporous DVB resin with remaining vinyl groups accessible for radical polymerisation were soaked in the monomer/initiator solution. The reaction mixture was gently stirred with a mechanical stirrer at 70° C. for 15 hours. After complete reaction excess monomer, oligomers and polymers not covalently coupled to the resin were removed by a washing procedure using dichloromethane as solvent. 4.90 gr. styrene modified resin was obtained yielding an increase in mass of 23%. In FIG. 4, the effect of grafting polystyrene from a macroporous DVB resin is shown for the separation of four peptides by RPC as described in example 1.

What is claimed is:

1. A method for post-modification of a macroporous polymeric support including one or more unreacted double bonds, said method comprising
   (a) contacting the polymeric support with a liquid phase comprising one or more grafting compounds;
   (b) initiating a free radical reaction in the mixture obtained from step (a) between one or more double bonds on said polymeric support and one or more reactive groups on the grafting compound, and optionally
   (c) washing the polymeric support to remove any excess of grafting compound;
wherein the grafting compound(s) are described by the general formula (I):

in which formula
   R=a $C_0$ to $C_{30}$ alkyl chain, optionally substituted with one or more hydroxyl, amine, carbonyl, ether; or an oxygen;
   R'=H or $CH_3$;
   R"=a $C_0$ to $C_{30}$ aliphatic or aromatic group; or an oxygen; and
   X=$O_n$, wherein n is an integer of 0–1,
with the proviso that if R" is oxygen or an aromatic group, then n is 0, and if R" is an alkyl chain, then n is 1.

2. The method of claim 1, wherein said macroporous polymeric support is a chromatographic support prepared from methacrylates and/or styrene derivatives as monomers.

3. The method of claim 1, wherein said macroporous polymeric support comprises divinylbenzene.

4. The method of claim 1, wherein the support is comprised of one or more particles.

5. The method of claim 1, wherein step (b) is performed by adding a free radical initiator in an amount sufficient to polymerise added grafting compound to the polymeric support.

6. The method of claim 1, wherein in formula (I), R is a $C_1$–$C_{10}$ alkyl chain, R' is H, R" is O and n is 0.

7. The method of claim 1, wherein R is a $C_{17}$ alkyl chain.

8. The method of claim 1, wherein R is a $C_1$–$C_{10}$ alkyl chain, R' is H, R" is $CH_2$ and n is 1.

9. The method of claim 1, wherein the grafting compound comprises at least one hydrophilic group, which method further comprises a step of derivatisation of said hydrophilic group(s).

10. The method of claim 1, wherein the grafting compound comprises at least one functional group in addition to the reactive double bond, which functional group is available as a ligand on the surface of the so modified support.

11. The method of claim 1, wherein R" is an aromatic group and the grafting compound is styrene or a derivative thereof.

12. The method of claim 1, which is suitable for preparation of a reverse phase chromatography (RPC) resin.

* * * * *